US009210326B2

(12) United States Patent
Miyata

(10) Patent No.: US 9,210,326 B2
(45) Date of Patent: Dec. 8, 2015

(54) IMAGING APPARATUS WHICH CONTROLS DISPLAY REGARDING CAPTURING, IMAGING METHOD, AND STORAGE MEDIUM

(71) Applicant: CASIO COMPUTER CO., LTD., Tokyo (JP)

(72) Inventor: Akira Miyata, Kodaira (JP)

(73) Assignee: CASIO COMPUTER CO., LTD., Tokyo (JP)

(*) Notice: Subject to any disclaimer, the term of this patent is extended or adjusted under 35 U.S.C. 154(b) by 91 days.

(21) Appl. No.: 13/940,911

(22) Filed: Jul. 12, 2013

(65) Prior Publication Data

US 2014/0063319 A1 Mar. 6, 2014

(30) Foreign Application Priority Data

Sep. 5, 2012 (JP) ................................ 2012-194896

(51) Int. Cl.
*H04N 5/232* (2006.01)

(52) U.S. Cl.
CPC ....... *H04N 5/23293* (2013.01); *H04N 5/23219* (2013.01)

(58) Field of Classification Search
CPC ...................... H04N 5/23293; H04N 5/23219
USPC ......................... 348/333.02–333.12, 207.99; 396/281–296
See application file for complete search history.

(56) References Cited

U.S. PATENT DOCUMENTS 7,123,284 B2 10/2006 Aoike
2004/0179091 A1* 9/2004 Aoike ........................ 348/14.02
2009/0059054 A1* 3/2009 Oishi et al. ............... 348/333.11
2010/0013945 A1* 1/2010 Hada .......................... 348/222.1
2010/0157128 A1* 6/2010 Choi et al. ............... 348/333.03
2010/0173678 A1* 7/2010 Kim et al. ..................... 455/566
2011/0069193 A1* 3/2011 Naka .......................... 348/222.1
2011/0267529 A1* 11/2011 Tabata ..................... 348/333.02
2012/0257071 A1* 10/2012 Prentice ..................... 348/220.1

FOREIGN PATENT DOCUMENTS

JP 2004-282399 A 10/2004
JP 2005-257869 A 9/2005
JP 2007-288353 A 11/2007
JP 2010-098629 A 4/2010

* cited by examiner

*Primary Examiner* — Mekonnen Dagnew
(74) *Attorney, Agent, or Firm* — Holtz, Holtz, Goodman & Chick PC

(57) ABSTRACT

An imaging apparatus which controls display regarding capturing, an imaging method and a storage medium are shown. According to one implementation, an imaging apparatus includes, an imaging section, a display section, an imaging control section, a condition related information setting section, a first specifying section, and a display control section. The imaging control section controls automatic imaging processing in which the imaging section automatically images a subject under a predetermined condition. The condition related information setting section sets condition related information regarding the predetermined condition which changes during the automatic imaging processing. The first specifying section specifies a number of subjects as a target of imaging. The display control section displays the set condition related information changing at least one of a size and/or a position according to the number of subjects specified by the first specifying section.

12 Claims, 9 Drawing Sheets

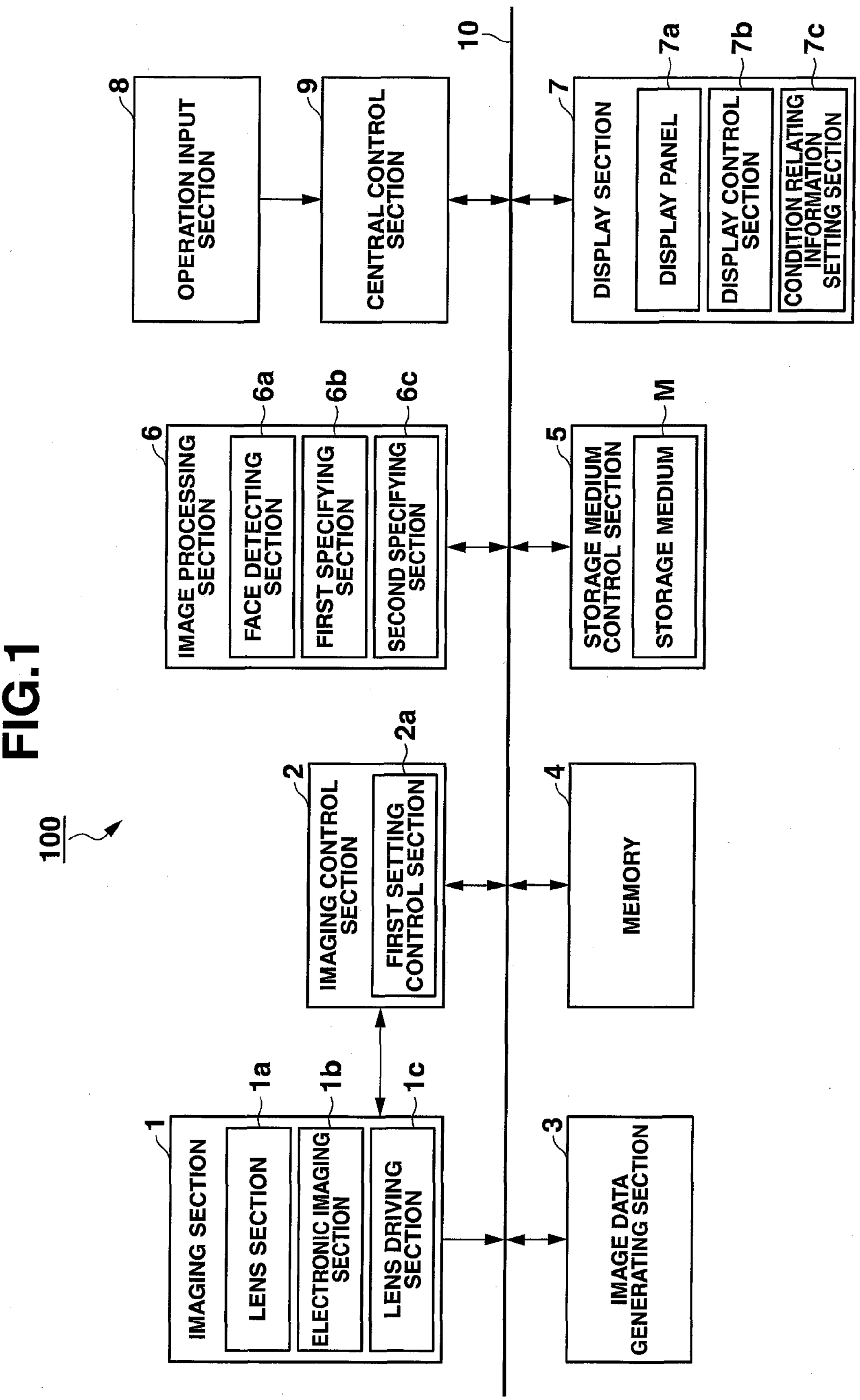
FIG.1
100
1
IMAGING SECTION
1a
LENS SECTION
1b
ELECTRONIC IMAGING SECTION
1c
LENS DRIVING SECTION
2
IMAGING CONTROL SECTION
2a
FIRST SETTING CONTROL SECTION
3
IMAGE DATA GENERATING SECTION
4
MEMORY
5
STORAGE MEDIUM CONTROL SECTION
M
STORAGE MEDIUM
6
IMAGE PROCESSING SECTION
6a
FACE DETECTING SECTION
6b
FIRST SPECIFYING SECTION
6c
SECOND SPECIFYING SECTION
7
DISPLAY SECTION
7a
DISPLAY PANEL
7b
DISPLAY CONTROL SECTION
7c
CONDITION RELATING INFORMATION SETTING SECTION
8
OPERATION INPUT SECTION
9
CENTRAL CONTROL SECTION
10

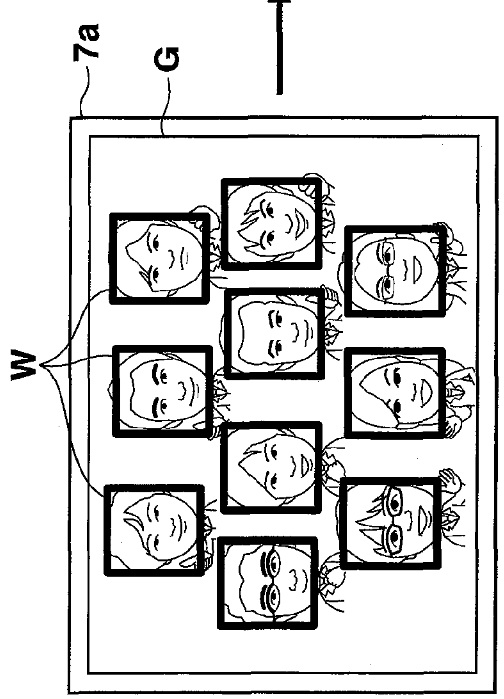
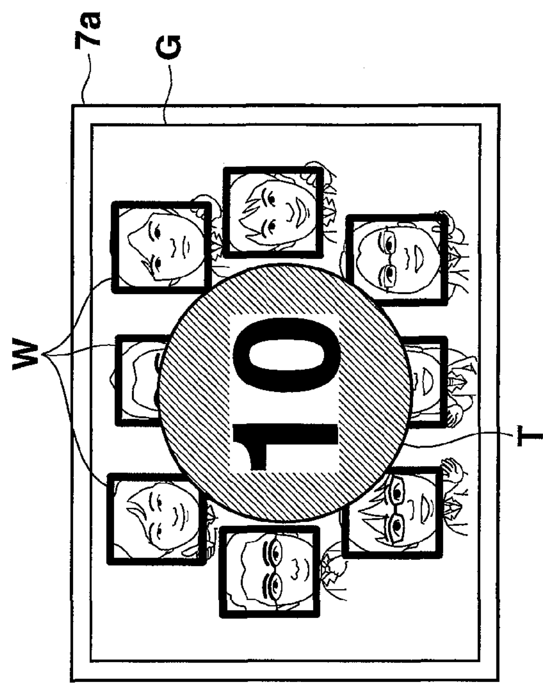
FIG.5A
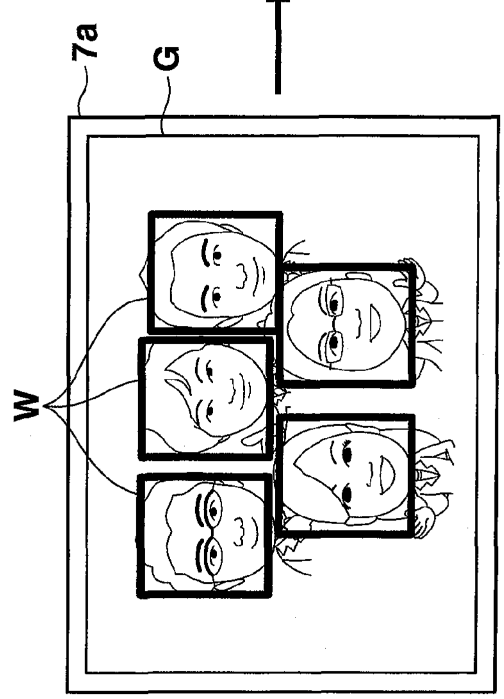
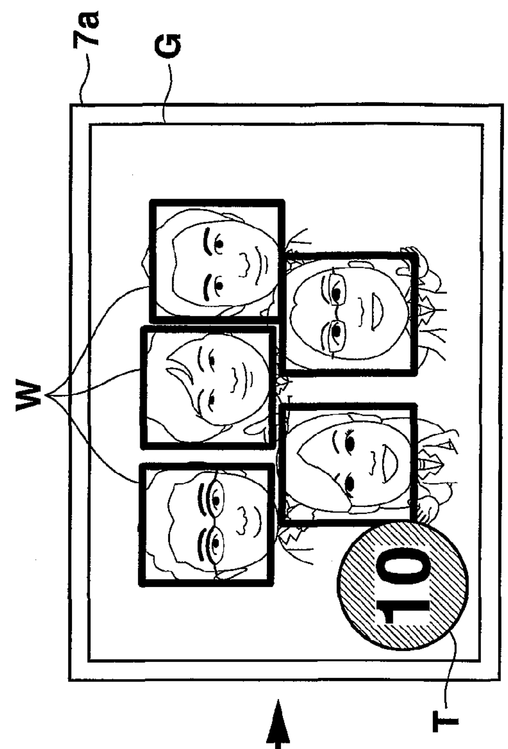
FIG.5B

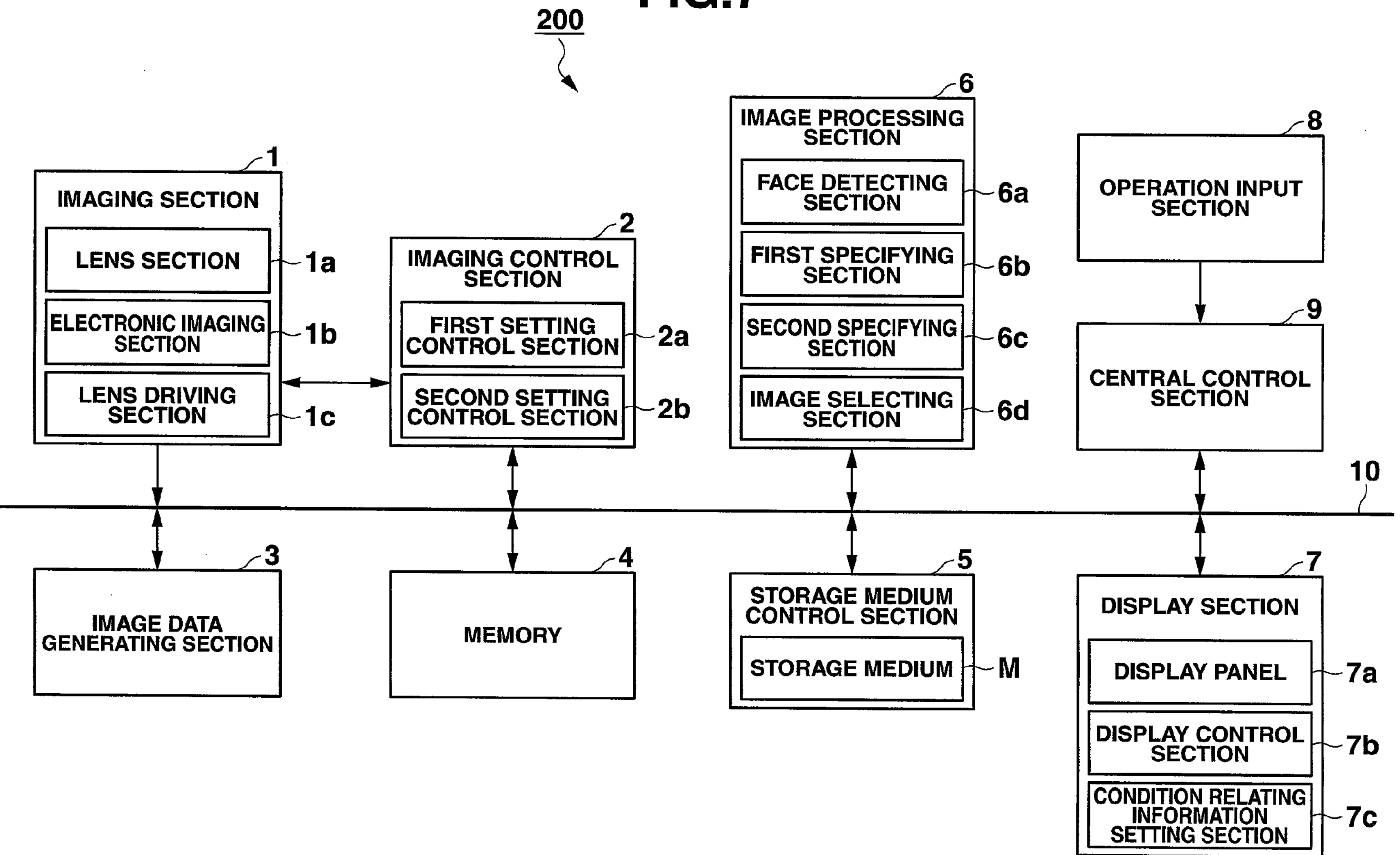
FIG.7
200
IMAGING SECTION
LENS SECTION
ELECTRONIC IMAGING SECTION
LENS DRIVING SECTION
IMAGING CONTROL SECTION
FIRST SETTING CONTROL SECTION
SECOND SETTING CONTROL SECTION
IMAGE PROCESSING SECTION
FACE DETECTING SECTION
FIRST SPECIFYING SECTION
SECOND SPECIFYING SECTION
IMAGE SELECTING SECTION
OPERATION INPUT SECTION
CENTRAL CONTROL SECTION
IMAGE DATA GENERATING SECTION
MEMORY
STORAGE MEDIUM CONTROL SECTION
STORAGE MEDIUM
DISPLAY SECTION
DISPLAY PANEL
DISPLAY CONTROL SECTION
CONDITION RELATING INFORMATION SETTING SECTION
1 1a 1b 1c 2 2a 2b 3 4 5 M 6 6a 6b 6c 6d 7 7a 7b 7c 8 9 10

IMAGING APPARATUS WHICH CONTROLS DISPLAY REGARDING CAPTURING, IMAGING METHOD, AND STORAGE MEDIUM

BACKGROUND OF THE INVENTION

1. Field of the Invention

The present invention relates to an imaging apparatus, an imaging method and a storage medium.

2. Description of the Related Art

Conventionally, for example, Japanese Patent Application Laid-Open Publication No. 2004-282399 discloses a technique to display a remaining time of a self-timer on a display, instead of flashing of the LED or sound to notify the remaining time of the self timer, so that the user can have a clearer understanding of the imaging timing.

SUMMARY OF THE INVENTION

According to an aspect of the present invention, there is provided an imaging apparatus including:

an imaging section;

a display section which displays an image imaged by the imaging section;

an imaging control section which controls automatic imaging processing in which the imaging section automatically images a subject under a predetermined condition after an imaging instruction is input;

a condition related information setting section which sets condition related information regarding the predetermined condition which changes during the automatic imaging processing;

a first specifying section which specifies a number of subjects as a target of imaging by the imaging section; and a display control section which displays on the display section the condition related information set by the condition related information setting section changing at least one of a size and/or a position according to the number of subjects specified by the first specifying section.

According to an aspect of the present invention, there is provided an imaging method for an imaging apparatus including an imaging section and a display section which displays an image imaged by the imaging section, the method including:

controlling automatic imaging processing in which the imaging section automatically images a subject under a predetermined condition after an imaging instruction is input;

setting condition related information regarding the predetermined condition which changes during the automatic imaging processing;

specifying a number of subjects as a target of imaging by the imaging section; and displaying on the display section the set condition related information changing at least one of a size and/or a position according to the number of specified subjects.

According to an aspect of the present invention, there is provided a non-transitory computer-readable storage medium having a program stored thereon for controlling a computer used in an imaging apparatus including an imaging section and a display section which displays an image imaged by the imaging section, wherein the program controls the computer to perform the following functions of:

an imaging control function which controls automatic imaging processing in which the imaging section automatically images a subject under a predetermined condition after an imaging instruction is input;

a condition related information setting function which sets condition related information regarding the predetermined condition which changes during the automatic imaging processing;

a specifying function which specifies a number of subjects as a target of imaging by the imaging section; and a display control function which displays on the display section the set condition related information changing at least one of a size and/or a position according to the number of subjects specified by the specifying function.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention and the above-described objects, features and advantages thereof will become more fully understood from the following detailed description with the accompanying drawings and wherein;

FIG. 1 is a block diagram showing a schematic configuration of an imaging apparatus of an embodiment employing the present invention;

FIG. 5A is a diagram schematically showing an example of a display of a live view image regarding the imaging processing shown in FIG. 3;

FIG. 5B is a diagram schematically showing an example of a display of a live view image regarding the imaging processing shown in FIG. 3;

FIG. 7 is a block diagram showing a schematic configuration of an imaging apparatus of modification 1;

DETAILED DESCRIPTION OF THE PREFERRED EMBODIMENTS

Below, an embodiment of the present invention is described with reference to the drawings. However, the scope of the invention is not limited to the illustrated examples.

Figure 2:
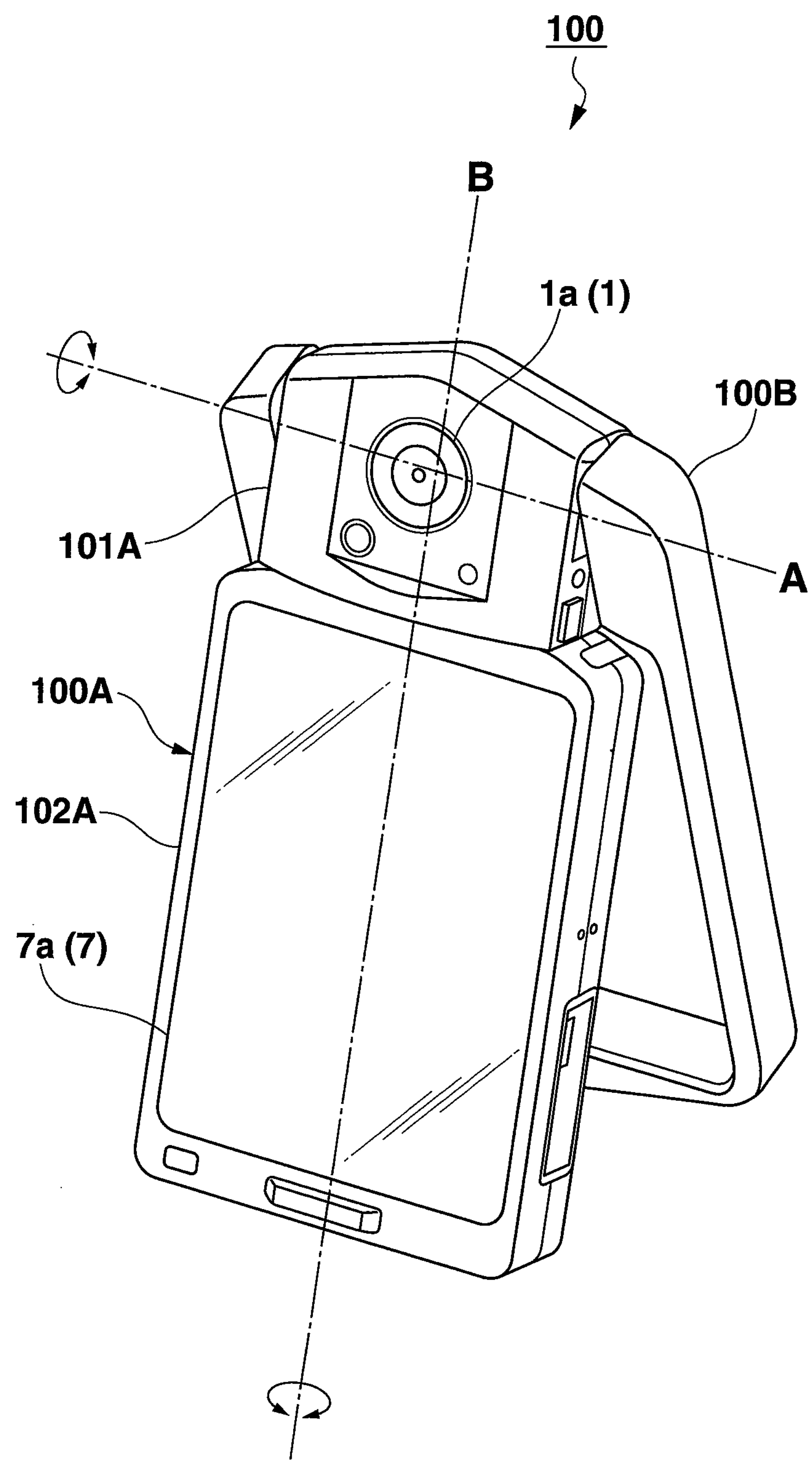
FIG. 2 is a perspective diagram showing an outer appearance of the imaging apparatus shown in FIG. 1.

FIG. 1 is a block diagram showing a schematic configuration of an imaging apparatus 100 of an embodiment employing the present invention. FIG. 2 is a perspective diagram showing an outer appearance of the imaging apparatus 100.

As shown in FIG. 1, the imaging apparatus 100 of the present embodiment includes, for example, an imaging section 1, an imaging control section 2, an image data generating section 3, a memory 4, a storage medium control section 5, an image processing section 6, a display section 7, an operation input section 8, and a central control section 9.

The imaging section 1, the imaging control section 2, the image data generating section 3, the memory 4, the storage medium control section 5, the image processing section 6, the display section 7, and the central control section 9 are connected through a bus line 10.

As shown in FIG. 2, according to the imaging apparatus 100, the apparatus main section 100A is supported by an axis to rotate freely in a predetermined angle around an axis (for example, axis A shown in FIG. 2, etc.) in a predetermined direction with relation to a predetermined position of a frame section 100B having an exterior shape in a substantial U-shape. According to the main section 100A, a tip end section 102A is configured to rotate freely in a predetermined angle around an axis (for example, axis B shown in FIG. 2, etc.) in a predetermined direction with relation to a base end section 101A supported with an axis by the frame section 100B.

The base end section 101A of the apparatus main section 100A is provided with the imaging section 1, etc., and the tip end section 102A of the apparatus main section 100A is provided with a display panel 7*a* (described later) of the display section 7 and the like. The tip end section 102A rotates substantially 180 degrees relatively with relation to the base end section 101A so that the display panel 7*a* is able to face the same side as an exposed face of a lens section 1*a* (later described) of the imaging section 1 (faces the subject) or to face the opposite side of the exposed face. When the display panel 7*a* faces the same side as the exposed face of the lens section 1*a*, the user can capture oneself while confirming by sight the image displayed on the display panel 7*a*.

The imaging section 1 images a predetermined subject (for example, a person, etc.) and generates a frame image.

Specifically, the imaging section 1 includes, a lens section 1*a*, an electronic imaging section 1*b*, and a lens driving section 1*c*.

For example, the lens section 1*a* is composed of a plurality of lenses such as a zoom lens, a focus lens, and the like. The lens section 1*a* is provided in the base end section 101A of the apparatus main section 100A, and any one of the lenses of the lens section 1*a* is exposed to the subject side when the imaging apparatus 100 is set.

For example, the electronic imaging section 1*b* includes an image sensor (imaging element) such as a CCD (Charge Coupled Device), CMOS (Complementary Metal-Oxide Semiconductor), etc. The electronic imaging section 1*b* converts the optical image which passes through the various lenses of the lens section 1*a* to two dimensional image signals.

For example, although illustration is omitted, the lens driving section 1*c* includes a zoom driving section which moves the zoom lens in an optical axis direction, a focus driving section which moves the focus lens in the optical axis direction and the like.

In addition to the lens section 1*a*, the electronic imaging section 1*b*, and the lens driving section 1*c*, the imaging section 1 can be provided with a diaphragm (not shown) which adjusts the amount of light passing through the lens section 1*a*.

The imaging control section 2 controls the imaging of the subject by the imaging section 1. In other words, although illustration is omitted, the imaging control section 2 includes a timing generator, a driver, and the like. The imaging control section 2 drives the scanning of the electronic imaging section 1*b* with the timing generator and the driver, converts the optical image which passes through the lens section 1*a* to a two dimensional image signal for each predetermined cycle with the electronic imaging section 1*b*, reads a frame image for each screen from the imaging region of the electronic imaging section 1*b*, and outputs the image data generating section 3.

The imaging control section 2 controls the timer imaging processing.

In other words, the imaging control section 2 controls automatic imaging processing in which after an imaging instruction is input, the imaging section 1 images a subject automatically under predetermined conditions.

Here, predetermined conditions include conditions for performing timer imaging processing (automatic imaging processing) in which after an imaging instruction is input, the imaging section 1 images a subject after a predetermined amount of time passes.

Specifically, for example, when the user selects the timer imaging processing by a predetermined operation on the operation input section 8, the imaging control section 2 sets the timing of imaging the subject with the imaging section 1 to a point after a predetermined amount of time passes (for example, 10 seconds, etc.) after an imaging instruction is input to the central control section 9 by a predetermined operation of the shutter button by the user. In other words, when the imaging instruction is input to the central control section 9 by a predetermined operation of the shutter button by the user in the timer imaging processing, the imaging control section 2 starts counting time with a time counting circuit (not shown, for example, timer, etc.), and at a point when a predetermined amount of time passes, the imaging control section 2 controls the imaging section 1 to image the subject.

The imaging control section 2 includes a first setting control section 2*a* and controls the timer imaging processing according to the condition set by the first setting control section 2*a*.

The first setting control section 2*a* sets the time for the timer in the timer imaging processing according to the number of subjects to be imaged.

In other words, the first setting control section 2*a* changes the time for the timer measured by the timekeeping circuit from when the imaging instruction is input in the central control section 9 to when the imaging section 1 images the subject in the timer imaging processing (automatic imaging processing) according to the number of subjects specified by a first specifying section 6*b* (later described) of the image processing section 6. Specifically, the first setting control section 2*a* sets the time for the timer in the timer imaging processing relatively longer as the number of people, which are the subjects, specified by the first specifying section 6*b* becomes larger.

For example, according to whether the number of people, which are the subjects, specified by the first specifying section 6*b* (later described) is larger than a predetermined number, the first setting control section 2*a* determines whether to set the time for the timer to a first time or a second time longer than the first time.

Then, the time for the timer is set by the first setting control section 2*a*, and the imaging control section 2 controls the imaging section 1 to image the subject at the point when the amount of time set for the timer passes from when the imaging instruction is input to the central control section 9.

Instead of the focus lens of the lens section 1*a*, the imaging control section 2 can move the electronic imaging section 1 in the optical axis direction to adjust the focus position of the lens section 1*a*.

The imaging control section 2 can control adjustment of the condition when imaging the subject by processing such as AF (automatic focus processing), AE (automatic exposure processing), AWB (automatic white balance), and the like.

The image data generating section 3 suitably adjusts gain for each color component of RGB in a signal of an analog value of a frame image transferred from the electronic imaging section 1*b*, samples and holds the signal with a sample and hold circuit (not shown) to convert to digital data with an A/D converter (not shown), performs color processing including pixel interpolation processing and gamma correction processing in the color processing circuit (not shown), and generates a luminance signal Y and color difference signals Cb, Cr of the digital value (YUV data).

The luminance signal Y and the color difference signals Cb, Cr output from the color processing circuit are transferred through a DMA controller which is not shown to the memory 4 used as a buffer memory.

For example, the memory 4 is composed of a DRAM (Dynamic Random Access Memory), and temporarily stores data processed by the image processing section 6, the central control section 9, etc.

A storage medium M can be attached and detached to the storage medium control section 5. The storage medium control section 5 controls reading of data from the attached storage medium M and writing of data on the storage medium M.

In other words, the storage medium control section 5 reads from the storage medium M image data of a static image encoded according to a predetermined encoding format (for example, JPEG format, motion JPEG format, MPEG format, etc.) or image data of a dynamic image including a plurality of image frames. Then, the storage medium control section 5 transfers the image data to the image processing section 6.

The storage medium M may be, for example, a nonvolatile memory (flash memory), etc., however, this is one example, and the present invention is not limited to the above. The present invention can be suitably changed.

The image processing section 6 includes a face detecting section 6*a*, a first specifying section 6*b*, and a second specifying section 6*c*.

Each section of the image processing section 6 is composed of, for example, a predetermined logic circuit. However, such configuration is one example, and the present invention is not limited to the above.

The later described processing performed by the image processing section 6 can be performed on reduced image data which is image data as the processing target reduced to a predetermined size (for example, VGA size, etc.) as necessary according to a predetermined ratio.

The face detecting section 6*a* detects a face region from an image as the processing target.

In other words, the face detecting section 6*a* detects the face region including the face from the image as the processing target obtained by the image processing section 6. Specifically, the image processing section 6 obtains from the memory 4 a copy of image data (RGB data and YUV data) of an image generated by the image data generating section 3 by imaging the subject with the imaging section 1 and the imaging control section 2. Then, the face detecting section 6*a* performs the predetermined face detecting processing on the image data to detect the face region.

The face detecting processing is a well known technique, and therefore detailed description is omitted.

The first specifying section 6*b* specifies the number of subjects imaged by the imaging section 1.

In other words, the first specifying section 6*b* specifies the number of people, which are the subjects and which are the target of imaging by the imaging section 1 in the timer imaging processing (automatic imaging processing). Specifically, the first specifying section 6*b* specifies the number of face regions detected in the face detecting processing as the number of people, which are the subjects, based on the result of the face detecting processing by the face detecting section 6*a*.

The specifying processing of the number of subjects as described above is one example, and the present invention is not limited to the above. The processing can be changed freely.

The second specifying section 6*c* specifies a position of a face of a person, which is a subject, imaged by the imaging section 1.

In other words, the second specifying section 6*c* specifies a position of a face of a person, which is the subject, imaged by the imaging section 1 in the timer imaging processing (automatic imaging processing). Specifically, the second specifying section 6*c* specifies coordinates of a predetermined position (for example, substantially center, four corners, etc.) of the face region detected in the face detecting processing as the position of the face of a person, which is the subject, based on a result of the face detecting processing by the face detecting section 6*a*.

The specifying processing of the position of the face of the person, which is the subject, as described above is one example, and the present invention is not limited to the above. The processing can be changed freely.

The display section 7 includes a display panel 7*a*, a display control section 7*b*, and a condition relating information setting section 7*c*.

The display panel 7*a* displays an image in the display screen. The display panel 7*a* is provided in a tip end section 102A of the apparatus main section 100A shown in FIG. 2. The tip end section 102A rotates around an axis (for example, axis B shown in FIG. 2, etc.) in a predetermined direction at substantially 180 degrees relative to the base end section 101A so that the display screen of the display panel 7*a* is able to face the subject side or the user side.

For example, a liquid crystal display panel, an organic EL display panel or the like can be used as the display panel 7*a*. However, the above are merely examples, and the present invention is not limited to the above.

The display control section 7*b* reads image data for display temporarily stored in the memory 4, and displays the predetermined image on the display screen of the display panel 7*a* based on the image data of the predetermined size decoded by the image processing section 6. Specifically, the display control section 7*b* includes a VRAM (video random access memory), a VRAM controller, a digital video encoder and the like (all not shown). The digital video encoder reads the luminance signal Y and the color difference signal Cb, Cr encoded by the image processing section 6 and stored in the VRAM at a predetermined play frame rate (for example, 30 fps) from the VRAM through the VRAM controller, and generates the video signal based on the data to be output to the display panel 7*a*.

For example, in the static image imaging mode and the dynamic image imaging mode, the display control section 7*b* displays on the display screen of the display panel 7*a* a live view image G which displays a plurality of frame images generated by imaging the subject with the imaging section 1 and the imaging control section 2 while renewing the image at a predetermined frame rate. The display control section 7*b* displays on the display screen of the display panel 7*a* an image to be stored as a static image or an image being stored as a dynamic image.

The display control section 7*b* changes the size and the position of the timer display T in the timer imaging processing.

In other words, the display control section 7*b* changes at least one of a size and/or position of the condition related information regarding a predetermined condition set by the condition related information setting section 7*c* according to the number of subjects specified by the first specifying section 6*d*. Then, the display control section 7*b* displays the condition related information on the display panel 7*a*.

The condition related information setting section 7*c* sets condition related information regarding a predetermined condition which changes during automatic imaging processing. Specifically, for example, in the timer imaging processing (automatic imaging processing), the condition related information setting section 7*c* sets as the condition related information the timer display (remaining time display) T which shows the remaining time continuously changing from the input of the imaging instruction to imaging of the subject.

In the timer imaging processing, the display control section 7*b* changes the size and the position of the timer display T showing the remaining time until imaging of the subject.

For example, the display control section 7*b* displays on the display panel 7*a* a live view image G imaged by the imaging section 1. The display control section 7*b* also displays the timer display T set by the condition related information setting section 7*c* in a predetermined position of the display screen of the display panel 7*a* overlapped on the live view image G. Here, as the number of people, which are the subjects, specified by the first specifying section 6*b* becomes larger, the display control section 7*b* displays on the display screen the timer display (condition related information) T in a relatively large manner in relation to the measure of the display screen of the display panel 7*a* (see FIG. 5A). The display control section 7*b* displays on the display screen of the display panel 7*a* the live view image G of the person as the subject imaged by the imaging section 1 and also displays the timer display (condition related information) T in a position different from the position of the face of the person specified by the second specifying section 6*c* in the live view image G (see FIG. 5B).

For example, when the number of people specified by the first specifying section 6*b* is equal to or more than a first judgment value (for example, 10 people, etc.), the display control section 7*b* displays the timer display T overlapped on the live view image G in a predetermined position (for example, substantially center section, etc.) of the live view image G displayed on the display panel 7*a* in a first measure to be equal to or larger than a predetermined ratio in relation to a measure (total pixel number) of the display screen of the display panel 7*a* (see FIG. 5A).

When the number of people specified by the first specifying section 6*b* is equal to or more than a second judgment value which is smaller than the first judgment value, and is less than the first judgment value (for example, 5 people, etc.), the display control section 7*b* displays the timer display T overlapped in the live view image G in a position (for example, bottom left portion of FIG. 5B) different from the position of the face of the people in the live view image G in a second measure which is smaller than the first measure (number of composing pixels is smaller).

Figure 6A:
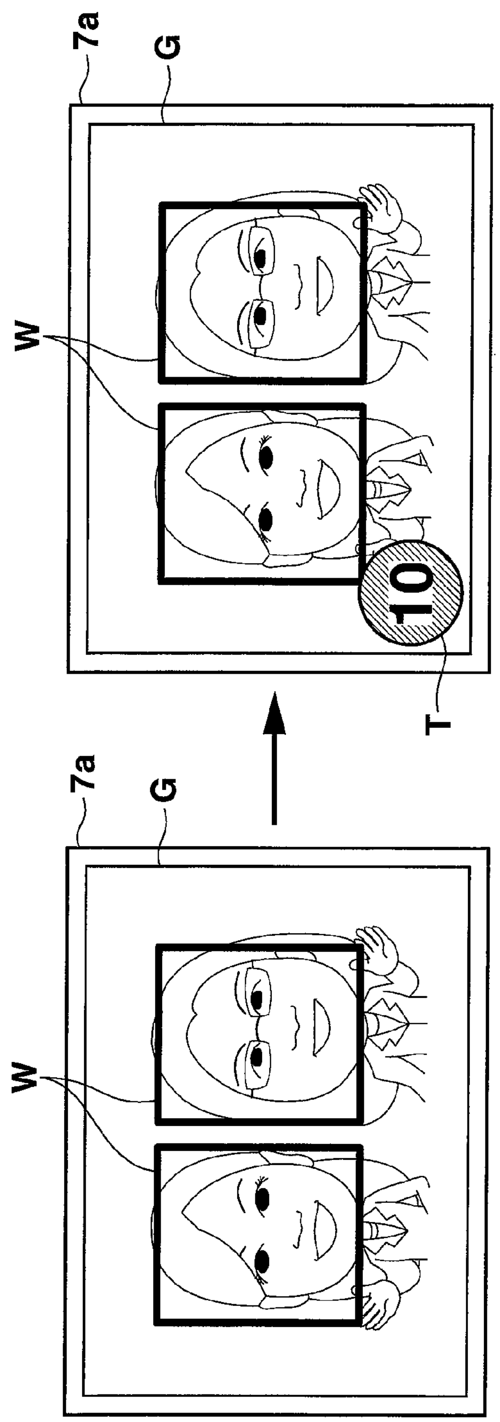
FIG. 6A is a diagram schematically showing an example of a display of a live view image regarding the imaging processing shown in FIG. 3.

When the number of people specified by the first specifying section 6*b* is equal to or more than a third judgment value which is smaller than the second judgment value and is less than the second judgment value (for example, 2 people, etc.), the display control section 7*b* displays the timer display T overlapped in the live view image G in a position (for example, bottom left portion of FIG. 6A) different from the position of the faces of the people in the live view image G in a third measure which is smaller than the second measure (number of composing pixels is smaller).

The description of "10" in FIG. 5A, etc. shows that the remaining time of the timer is 10 seconds, and schematically shows an example of the timer display T which reduces (counts down) according to the time measured.

Figure 6B:
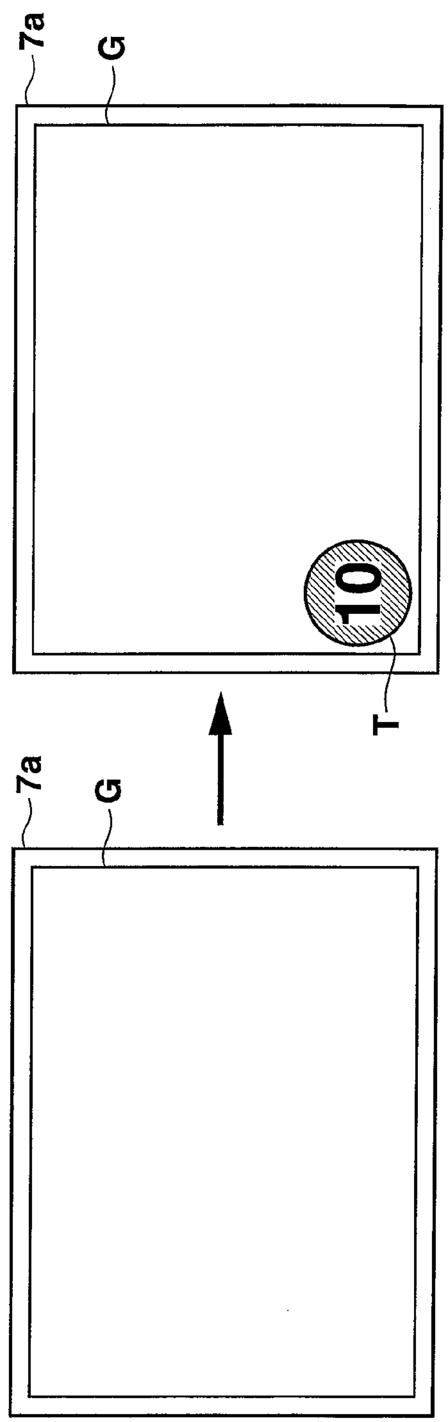
FIG. 6B is a diagram schematically showing an example of a display of a live view image regarding the imaging processing shown in FIG. 3.

When the face of the person as a subject is not specified by the first specifying section 6*b*, the display control section 7*b* displays the timer display T in a relatively small manner in relation to the measure of the display screen of the display panel 7*a*, in an edge portion of the display screen of the display panel 7*a*. In other words, when the number of faces of people specified by the first specifying section 6*b* is 0, the display control section 7*b*, for example, displays the timer display T overlapped on the live view image G in an edge portion (for example, bottom left portion of FIG. 6B) of the live view image G in the third measure.

The measure of the timer display T is to be the third measure when the number of a face of a person specified by the first specifying section 6*b* is 0, and when the number of people specified by the first specifying section 6*b* is equal to or more than the third judgment value and less than the second judgment value (for example, 2 people). However, the above is one example, and the present invention is not limited to the above. The measure of the timer display T can be suitably changed.

The display control of the timer display (condition related information) T described above is one example, and the present invention is not limited to the above. The display control can be suitably changed freely.

The display control section 7*b* can change the size and the position of the timer display (condition related information) T according to the number of subjects. However, the above is one example, and the present invention is not limited to the above. For example, only the size of the timer display T or only the position of the timer display T may be changed.

The operation input section 8 is for predetermined operation of the imaging apparatus 100. Specifically, the operation input section 8 includes an operation section such as a shutter button for an imaging instruction of the subject, a selection enter button for selection instruction of the imaging mode, function, etc., a zoom button for instruction of adjustment of zoom amount, and the like (all not shown). The operation input section 8 outputs to the central control section 9 a predetermined operation signal according to the operation of the buttons of the operation section.

The central control section 9 controls each section of the imaging apparatus 100. Specifically, although not shown, the central control section 9 includes a CPU (Central Processing Unit), etc. and performs various control operation according to various processing programs (not shown) for the imaging apparatus 100.

<Imaging Processing>

Next, the imaging processing by the imaging apparatus 100 is described with reference to FIG. 3 to FIG. 6.

Figure 3:
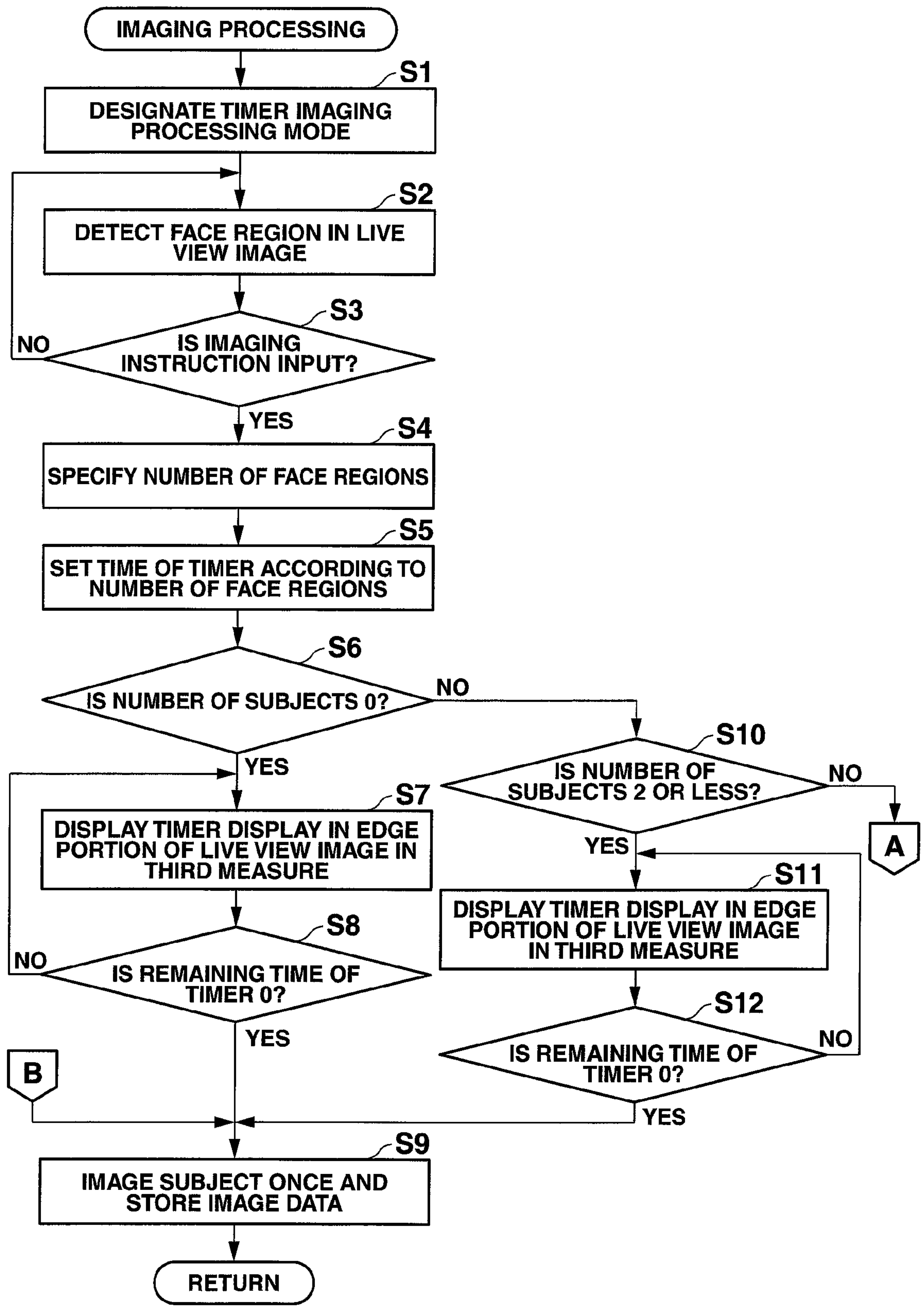
FIG. 3 is a flowchart showing an example of an operation regarding imaging processing by the imaging apparatus shown in FIG. 1.
Figure 4:
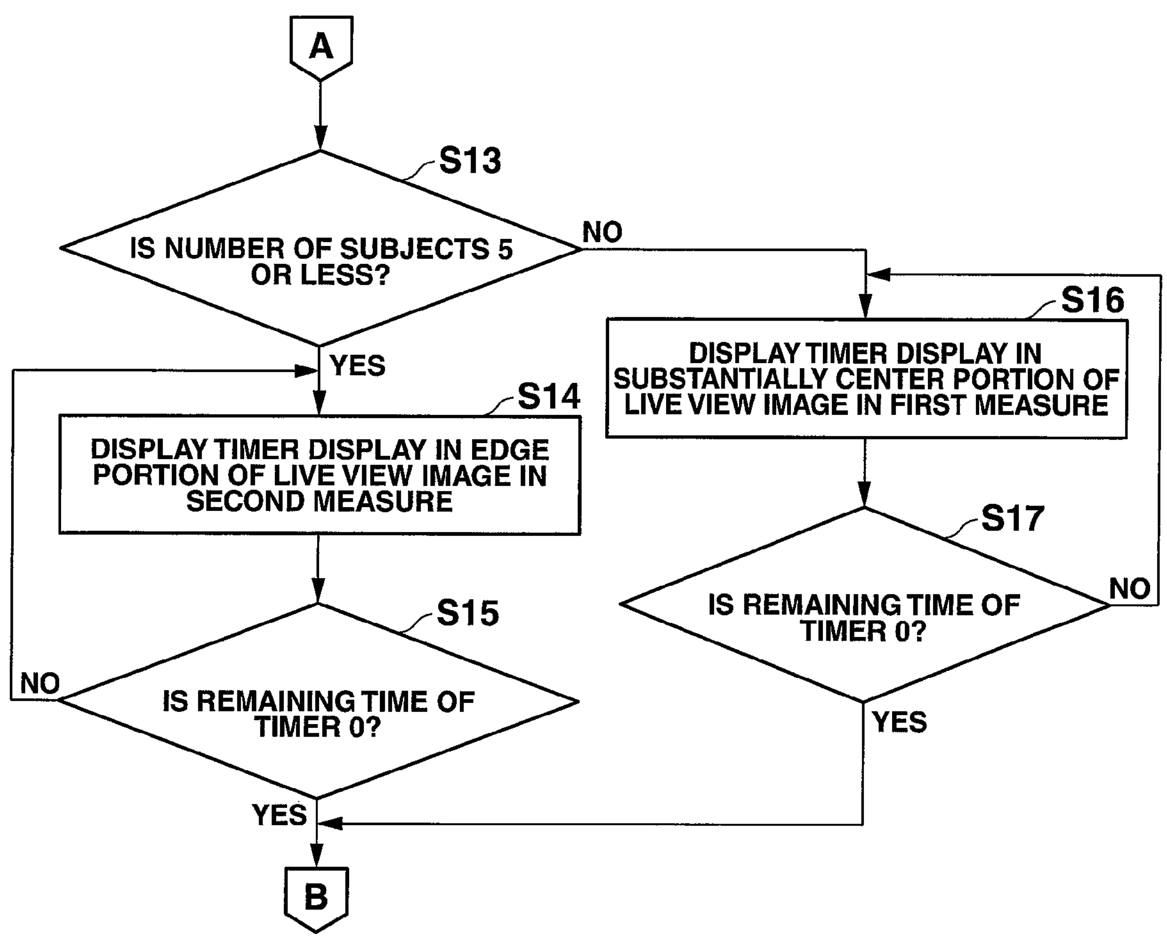
FIG. 4 is a flowchart showing a continuation of the imaging processing shown in FIG. 3.

FIG. 3 and FIG. 4 are flowcharts showing an example of an operation of the imaging processing.

The imaging processing is operation performed by various sections of the imaging apparatus 100 under control of the central control section 9 when the imaging mode is selected from the plurality of operation modes displayed on the menu screen based on the predetermined operation of the selection enter button of the operation input section 8 by the user.

As shown in FIG. 3, first, when the instruction to designate the timer imaging mode is input based on the predetermined operation of the operation input section 8 by the user, the CPU of the central control section 9 outputs the designating instruction to the imaging control section 2 and the imaging control section 2 designates the imaging mode to the timer imaging processing mode (step S1).

Then, the face detecting section 6*a* obtains from the memory 4 a copy of the image data of the live view image G generated by the image data generating section 3 from the imaging of the subject by the imaging section 1 and the imaging control section 2, and performs the predetermined face detecting processing on the image data to detect the face region (step S2). Here, the display control section 7*b* displays the face detecting frame W so as to overlap on the face region detected by the face detecting section 6*a* (see FIG. 5A, etc.).

Next, the CPU of the central control section 9 judges whether the imaging instruction is input based on the predetermined operation of the shutter button of the operation input section 8 by the user (step S3).

Here, when it is judged that the imaging instruction is not input (step S3; NO), the CPU of the central control section 9 returns the processing to step S2 and the face detecting section 6*a* performs the processing to detect the face region.

In step S3, when it is judged that the imaging instruction is input (step S3; YES), the first specifying section 6*b* specifies the number of face regions detected in the face detecting processing to be the number of people which are the subjects based on the result of the face detecting processing by the face detecting section 6*a* (step S4).

Next, according to the number of subjects specified by the first specifying section 6*b*, the first setting control section 2*a* of the imaging control section 2 sets the time of the timer counted until the subject is imaged by the imaging section 1, and the time counting circuit (for example, timer, etc.) starts counting the time (step S5). Specifically, the first setting control section 2*a* sets the time of the timer to be relatively longer as the number of people as the subject increases.

Next, the display control section 7*b* judges whether the number of people, which are the subjects, specified by the first specifying section 6*b* is 0 (zero) (step S6).

Here, when the number of people judged to be the subject is 0 (step S6; YES), the display control section 7*b* overlaps the timer display T set by the condition related information setting section 7*c* on the live view image G in the edge portion (for example, bottom left portion of FIG. 6B) of the live view image G displayed on the display panel 7*a*, and displays the timer display T in the third measure (step S7; see FIG. 6B). Next, the imaging control section 2 judges whether the remaining time of the timer counted down by the time counting circuit is 0 (step S8). In other words, the imaging control section 2 judges whether the remaining time of the timer is 0 which is the timing to image the subject to store an image.

In step S8, when it is judged that the remaining time of the timer is not 0 (step S8; NO), since it is not the timing to store the image of the subject, the CPU of the central control section 9 returns the processing to step S7. The display control section 7*b* updates the remaining time of the timer to be reduced according to the time measured by the time keeping circuit and displays the remaining time on the display panel 7*a*.

In step S8, when it is judged that the remaining time of the timer is 0 (step S8; YES), the imaging control section 2 controls the imaging section 1 to image the subject only once, and the storage medium control section 5 stores the image data of the subject in the storage medium M (step S9). Specifically, the imaging control section 2 controls the imaging section 1 to image the subject, the image data generating section 3 generates the image data of the subject to output the image data to the storage medium control section 5, and the storage medium control section 5 stores the image data of the subject encoded according to a predetermined encoding format in the storage medium M.

In step S6, when the number of people as the subject is judged to be 0 (step S6; NO), the display control section 7*b* judges whether the number of people, which are the subjects, specified by the first specifying section 6*b* is equal to or less than 2 (step S10).

Here, when it is judged that the number of people as the subject is 2 or less (step S10; YES), the display control section 7*b* overlaps the timer display T set by the condition related information setting section 7*c* on the live view image G in the edge portion (for example, bottom left portion of FIG. 6A) of the live view image G displayed on the display panel 7*a* and displays the timer display T in the third measure (step S11; see FIG. 6A). Next, the imaging control section 2 judges whether the remaining time of the timer counted down by the time keeping circuit is 0 (step S12).

In step S12, when it is judged that the remaining time of the timer is not 0 (step S12; NO), since it is not the timing to store the image of the subject, the CPU of the central control section 9 returns the processing to step S11. The display control section 7*b* updates the remaining time of the timer to be reduced according to the time measured by the time keeping circuit and displays the remaining time on the display panel 7*a*.

In step S12, when it is judged that the remaining time of the timer is 0 (step S12; YES), the CPU of the central control section 9 advances the processing to step S9, the imaging control section 2 controls the imaging section 1 to image the subject only once, and the storage medium control section 5 stores the image data of the subject in the storage medium M (step S9).

In step S10, when it is judged that the number of people as the subject is not 2 or less (step S10; NO), as shown in FIG. 4, the display control section 7*b* judges whether the number of people specified as the first specifying section 6*b* is 5 or less (step S13).

Here, when it is judged that the number of people as the subject is 5 or less (step S13; YES), the display control section 7*b* overlaps the timer display T set by the condition related information setting section 7*c* on the edge portion (for example, bottom left portion of FIG. 5B) of the live view image G displayed on the display panel 7*a*, and displays the time display T in the second measure larger than the third measure (step S14). Next, the imaging control section 2 judges whether the remaining time of the timer counted down by the time counting circuit is 0 (step S15).

In step S15, when it is judged that the remaining time of the timer is not 0 (step S15; NO), since it is not the timing to store the image of the subject, the CPU of the central control section 9 returns the processing to step S14. The display control section 7*b* updates the remaining time of the timer to be reduced according to the time measured by the time keeping circuit to display the remaining time on the display panel 7*a*.

In step S15, when it is judged that the remaining time of the timer is 0 (step S15; YES), as shown in FIG. 3, the CPU of the central control section 9 advances the processing to step S9, the imaging control section 2 controls the imaging section 1 to image the subject only once, and the storage medium control section 5 stores the image data of the subject in the storage medium M (step S9).

In step S13, when it is judged that the number of people as the subject is 5 or less (step S13; NO), the display control section 7*b* overlaps the timer display T set by the condition related information setting section 7*c* in substantially the center portion on the live view image G displayed on the display panel 7*a*, in the first measure larger than the second measure and displays the timer display T (step S16; see FIG. 5A). Then, the imaging control, section 2 judges whether the remaining time of the timer counted down by the time keeping circuit is 0 (step S17).

In step S17, when it is judged that the remaining time of the timer is not 0 (step S17; NO), since it is not the timing to store the image of the subject, the CPU of the central control section 9 returns the processing to step S16. The display control section 7*b* updates the remaining time of the timer to be reduced according to the time measured by the time counting circuit to display the remaining time of the timer on the display panel 7*a*.

In step S17, when it is judged that the remaining time of the timer is 0 (step S17; YES), as shown in FIG. 3, the CPU of the central control section 9 advances the processing to step S9, the imaging control section 2 controls the imaging section 1 to image the subject only once, and the storage medium control section 5 stores the image data of the subject in the storage medium M (step S9).

As described above, according to the imaging apparatus 100 of the present embodiment, at least one of the size and/or the position of the timer display (condition related information) displayed on the display panel 7*a* provided to face the subject side is changed according to the number of subjects imaged by the imaging section 1. Therefore, it is possible to display the condition related information regarding the predetermined condition which changes up to when the subject is imaged in the automatic imaging processing on the display panel 7*a* which displays the image of the subject imaged by the imaging section 1. Consequently, it is possible to suitably perform automatic imaging processing of a plurality of subjects using the condition related information. Specifically, it is possible to display the timer display T showing the remaining time until imaging the subject with the timer imaging processing on the display panel 7*a* and it is possible to suitably set the size and the position of the timer display (condition related information) T according to the number of subjects.

In other words, in a state where the focus distance is fixed, the angle of view is a predetermined size, and the number of subjects that can be captured by the imaging section 1 increases and decreases according to the position (subject distance) where the subject is with respect to the apparatus. For example, when the distance from the apparatus to the subject is relatively close, only a relatively small number of subjects can be imaged, whereas when the distance from the apparatus to the subject is relatively far, a relatively large number of subjects can be imaged. Assuming that the increase and the decrease of the number of subjects imaged by the imaging section 1 corresponds to the distance to the subject, the size and/or the position of the timer display T is suitably changed according to the number of subjects considering the visibility of the timer display T and the ease for the subjects to confirm the composition. Specifically, the timer display T is displayed relatively larger in relation to the display screen of the display panel 7*a* as the number of subjects becomes larger so that even if the distance to the subjects is relatively far, it is possible to prevent decrease of visibility of the timer display T by the subjects. When the face of the person as the subject is not specified, the timer display T is displayed relatively smaller in relation to the display screen in an edge portion in the display screen of the display panel 7*a*. It is considered that when scenery, flowers or the like are imaged, there is no need for the subject to confirm the timer display T. Therefore, the timer display T is displayed to put priority on confirming the composition, and the timer display T is displayed on the display panel 7*a* so that the timer display T does not interfere the user confirming the composition.

Since the imaged live view image G is displayed on the display panel 7*a* and the timer display T is displayed on the display panel 7*a* overlapped with the live view image G, the user is able to confirm the live view image G and the timer display T displayed on the display panel 7*a*. Therefore, the user is able to confirm the composition of the subject together with the remaining time until imaging.

Since the image of the person as the imaged subject is displayed on the display panel 7*a* and the timer display T is displayed in a position different from the position of the face of the person in the image, it is possible to display the timer display T on the display panel 7*a* so that the timer display T does not interfere the subject confirming the position and the expression of the face of the person as the subject.

The timer imaging processing changes the time of the timer until imaging of the subject by the imaging section 1 according to the number of subjects. Therefore, it is possible to set the time of the timer to a suitable length according to the number of subjects. In other words, when a plurality of subjects are imaged, it is assumed that a relatively long period of time is necessary for all of the subjects to be prepared. Therefore, by setting the time of the timer in the timer imaging processing relatively longer as the number of subjects relatively increases, it is possible to reduce errors such as imaging before all of the subjects are ready.

By setting the time of the timer according to the number of subjects, it is possible to enhance usability of the timer imaging processing.

According to the above embodiment, the display size changes in each stage. Alternatively, the display size can change in proportion with the number of people.

According to the above embodiment, the time of the timer is different according to the number of subjects, however, this is one example, and the present invention is not limited to the above. The time of the timer does not need to be different. In other words, the imaging apparatus 100 can be suitably changed as to whether to include the first setting control section 2*a*.

The present invention is not limited to the above embodiment, and various modifications and changes in design can be made without leaving the scope of the invention.

A modification of the imaging apparatus 100 is described below.

<Modification 1>

FIG. 7 is a block diagram showing a schematic configuration of the imaging apparatus 200 of modification 1.

Other than the points described in detail below, the imaging apparatus 200 of modification 1 has a configuration similar to that of the imaging apparatus 100 of the above embodiment, and therefore the detailed description is omitted.

As shown in FIG. 7, according to the imaging apparatus 200 of modification 1, the imaging control section 2 includes a second setting control section 2*b* in addition to the first setting control section 2*a*, and the image processing section 6 includes an image selecting section 6*d* in addition to the face detecting section 6*a*, the first specifying section 6*b*, and the second specifying section 6*c*.

The image processing section 6 controls the timer imaging processing according to the conditions set by the first setting control section 2*a* and the second setting control section 2*b*.

The second setting control section 2*b* sets the number to be imaged in the timer imaging processing according to the number of subjects to be imaged.

In other words, the second setting control section 2*b* changes the number of images of the subject successively imaged by the imaging section 1 in the timer imaging processing (automatic imaging processing) according to the number of subjects specified by the first specifying section 6*b* of the image processing section 6. Specifically, the second setting control section 2*b* sets the number imaged in the timer imaging processing relatively larger as the number of people, which are the subjects, specified by the first specifying section 6*b* increases.

For example, the second setting control section 2*b* sets the number to be imaged so that the number increases according to a predetermined arithmetic equation based on the number of people, which are the subjects, specified by the first specifying section 6*b*. In other words, when 1 person is specified as the subject or a person is not specified, the second setting control section 2*b* sets 1 image as the number to be imaged. When 2 or more people are specified, the second setting control section 2*b* sets the number to be imaged to 2 or more, for example, when the number of people as the subject is 2 people, the number to be imaged is set to 3 images, when the number of people as the subject is 5 people, the number to be imaged is set to 5 images, and when the number of people as the subject is 10 people, the number to be imaged is set to 8 images.

Then, when the number of images is set by the second setting control section 2*b*, at a point when a predetermined amount of time passes from the input of the imaging instruction to the central control section 9, the imaging control section 2 controls the imaging section 1 at a predetermined time interval to successively image the subject until the set number of images of the subject is generated.

The number to be imaged as described above is one example, and the present invention is not limited to the above. The number can be set freely.

The image selecting section 6*d* selects a specific image from the plurality of images imaged successively.

In other words, in the timer imaging processing (automatic imaging processing), the image selecting section 6*d* selects a specific image as a reference of the state of the subject in the image from among a predetermined number of images imaged successively by the imaging section 1. Specifically, the image selecting section 6*d* evaluates the state of the face of each person as the subject (for example, degree of blinking, degree of smiling, degree of blurring, etc.) for each of the plurality of images imaged successively by the imaging section 1, and converts the evaluation to calculate an evaluation value where a value of a more desirable face is smaller. Then, the image selecting section 6*d* selects the image with the best (smallest) calculated evaluation value as the specific image.

The method of evaluating the degree of blinking, degree of smiling, degree of blurring, etc. is a well known technique, and the detailed description is omitted here. As the state of a face of a person, the degree of blinking and the degree of smiling are shown, however these are merely examples and the present invention is not limited to the above. The above can be changed freely.

<Imaging Processing>

Next, the imaging processing by the imaging apparatus 200 of modification 1 is described with reference to FIG. 4 and FIG. 8.

Figure 8:
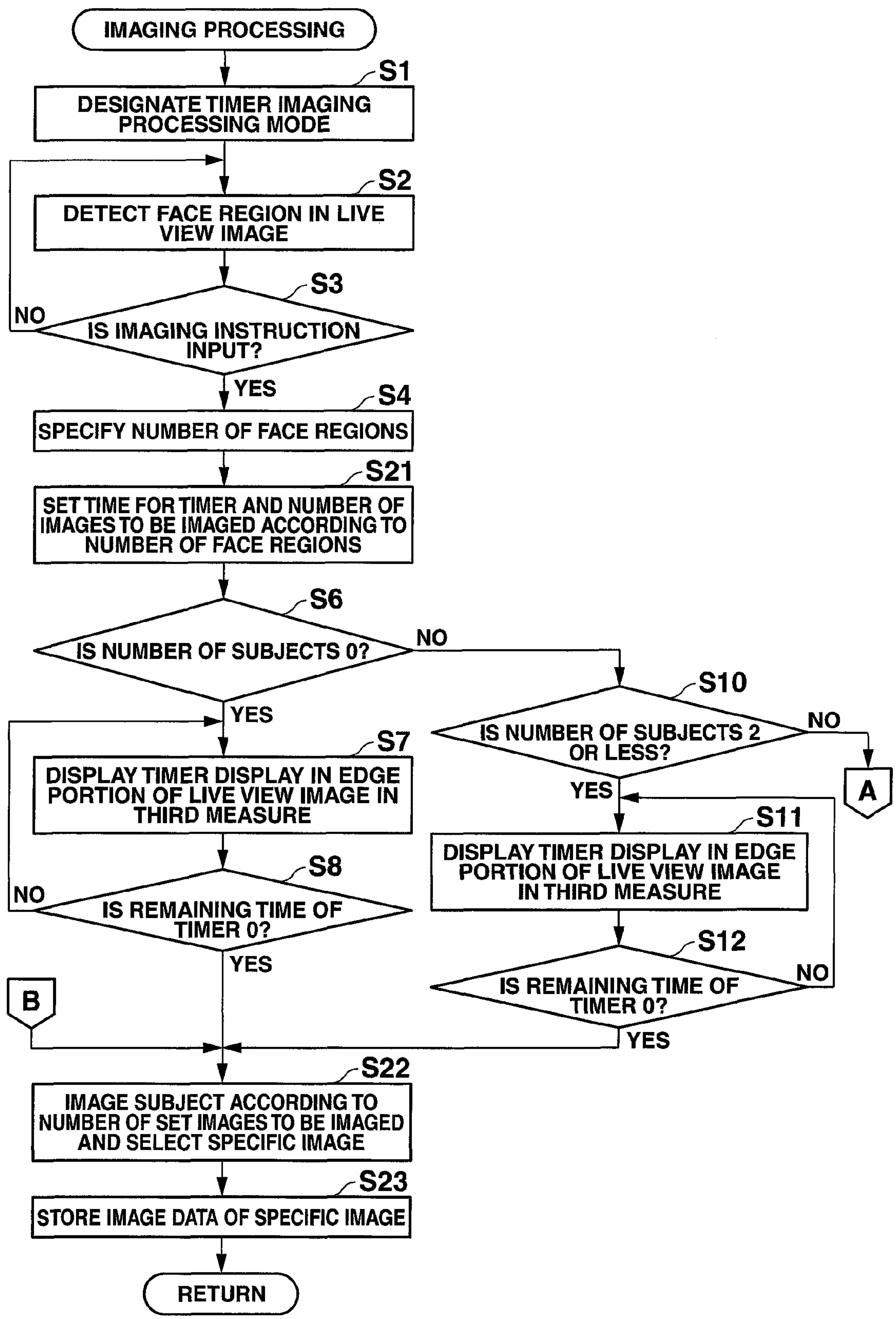
FIG. 8 is a flowchart showing an example of an operation regarding the imaging processing by the imaging apparatus shown in FIG. 7.

FIG. 8 is a flowchart showing an example of operation of the imaging processing.

Other than the points described below, the imaging processing by the imaging apparatus 200 of modification 1 is similar to the imaging processing of the imaging apparatus 100 of the present embodiment, and the detailed description is omitted.

As shown in FIG. 8, the imaging processing 200 of modification 1 performs the processing of steps S1 to S4 similar to the imaging processing of the above embodiment. In step S4, according to the number of subjects specified by the first specifying section 6*b*, the first setting control section 2*a* of the imaging control section 2 sets the time of the timer up to when the imaging section 1 images the subject, and the second setting control section 2*b* sets the number of images that the imaging section 1 is to image the subject successively (step S21). Specifically, similar to the imaging processing of the above embodiment, the first setting control section 2*a* sets the time of the timer relatively longer as the number of people as the subject increases. Moreover, the second setting control section 2*b* sets the number to be imaged in the timer imaging processing relatively larger as the number of people as the subject increases.

Then, similar to the above imaging processing of the above embodiment, the imaging apparatus 200 of modification 1 performs the processing from step S6 and after. Then, in step S8, when it is judged that the remaining time of the timer is 0 (step S8; YES), the imaging control section 2 controls the imaging section 1 to image the subject according to the number of images to be imaged set in step S21, and the image selecting section 6*d* selects the specific image based on the state of the face of the person as a subject in the image from the predetermined number of imaged images (step S22).

Similarly, when it is judged that the remaining time of the timer is 0 in step S12 (step S12; YES), or when it is judged that the remaining time of the timer is 0 in step S15 (step S15; YES), or when it is judged that the remaining time of the timer is 0 in step S17 (step S17; YES), the imaging control section 2 performs the processing of step S22.

For example, in step S21, when 1 image is set as the number to be imaged, the imaging control section 2 controls the imaging section 1 to image the subject only once, and the image selecting section 6*d* selects the imaged image as the specific image (step S22).

For example, in step S21, when 2 images are set as the number to be imaged, the imaging control section 2 controls the imaging section 1 to successively image the subject according to the set number of images, and the image selecting section 6*d* selects 1 image as the specific image based on the state of the face of the person as a subject in the image from among the plurality of imaged images (step S22).

Then, the storage medium control section 5 stores the image data of the specific image encoded according to a predetermined encoding method in the storage medium M (step S23).

Therefore, according to the imaging apparatus 200 of modification 1, similar to the above embodiment, it is possible to suitably perform the automatic imaging processing of a plurality of subjects using the timer display (condition related information) T displayed on the display panel 7*a*. Moreover, since the number of images that the imaging section 1 images the subject successively in the timer imaging processing is changed according to the number of subjects, it is possible to suitably set the number of images to be imaged according to the number of subjects. In other words, when a plurality of subjects are imaged, there is a possibility that all of the subjects are not prepared at the same timing. Therefore, by setting the number of images to be imaged in the timer imaging processing to be relatively larger as the number of subjects relatively increases, it is possible to reduce errors where the image is imaged before the subject is ready.

Further, a specific image is selected based on the state of the subject in the image from among the predetermined number of images imaged successively. Therefore, even when a plurality of subjects are imaged, it is possible to select the specific image where more subjects are in the best state (for example, expression when imaging a person).

As described above, by setting the number of images to be imaged according to the number of subjects, it is possible to enhance usability of the timer imaging processing.

According to the above described embodiment and modification 1, processing of specifying the number of face regions based on the result of the face detecting processing by the face detecting section 6*a* is shown as a method of specifying the number of people as the subject. However, the above is one example, and the present invention is not limited to the above. For example, the number of subjects can be specified based on the input of the number of people according to the operation of the operation input section 8 by the user. With this, the face detecting processing is not necessary and the processing load can be reduced.

According to the present embodiment and modification 1, the timer imaging processing which images the subject after a predetermined amount of time passes from input of the imaging instruction is shown as the automatic imaging processing. However, the above is one example, and the present invention is not limited to the above. The processing can be suitably changed.

For example, the imaging apparatus 100 (200) can perform the automatic imaging processing which automatically images the subjects when all of the plurality of subjects are in a certain state (for example, smiling, eyes open, etc.). The size and/or the position of the subject state display (condition related information) C of the number of subjects in the specific state displayed on the display panel 7*a* can be changed according to the number of subjects which is the target to be imaged (see FIG. 9A and FIG. 9B).

Specifically, the image processing section 6 judges whether the face of a person as the subject detected from the live view image G by the face detecting section 6*a* is a specific state (for example, smiling, eyes open, etc.). In other words, the image processing section 6 judges whether the predetermined condition of the subject which changes up to when the subject is imaged in the automatic imaging processing is satisfied.

The methods of judging a state of smiling, eyes open, etc. are well known techniques. Therefore, the detailed description is omitted here. As the specific state of the face of the person, a state of smiling, eyes open, etc. are shown. However, these are merely examples and the present invention is not limited to the above. The above can be suitably changed.

The display control section 7*b* changes at least one of the size and/or the position of the subject state display C, regarding the number of subjects in the specific state which changes after input of the imaging instruction, displayed on the display panel 7*a* according to the number of subjects specified by the first specifying section 6*b*. For example, the display control section 7*b* displays the subject state display C in a position different from the position of the face of the person as the subject in the live view image G displayed on the display screen of the display panel 7*a*. Here, the display control section 7*b* displays on the display screen the subject state display C in a relatively larger manner in relation to the measure of the display screen of the display panel 7*a*, as the number of people as the subject increases.

For example, when a number of people equal to or more than a predetermined judgment value (for example, 3 people, etc.) are specified by the first specifying section 6*b*, the display control section 7*b* displays the subject state display C overlapped with the live view image G in a predetermined position of the live view image G displayed on the display panel 7*a* (for example, bottom left portion of FIG. 9A) in the first measure which is a predetermined ratio or more in relation to the measure (total number of pixels) of the display screen of the display panel 7*a*. When a number of people less than the predetermined judgment value (for example, 2 people, etc.) are specified by the first specifying section 6*b*, the display control section 7*b* displays the subject state display C overlapped with the live view image G in the second measure which is smaller than the first measure (less composing pixels) (see FIG. 9B).

The change of the size of the subject state display C is one example and the present invention is not limited to the above. The judgment value, measures, etc. can be changed freely. The display control section 7*b* changes only the size of the subject state display C according to the number of subjects. However, this is one example, and the present invention is not limited to the above. For example, in addition to the size or instead of the size, the position of the subject state display C can be changed.

Figure 9A:
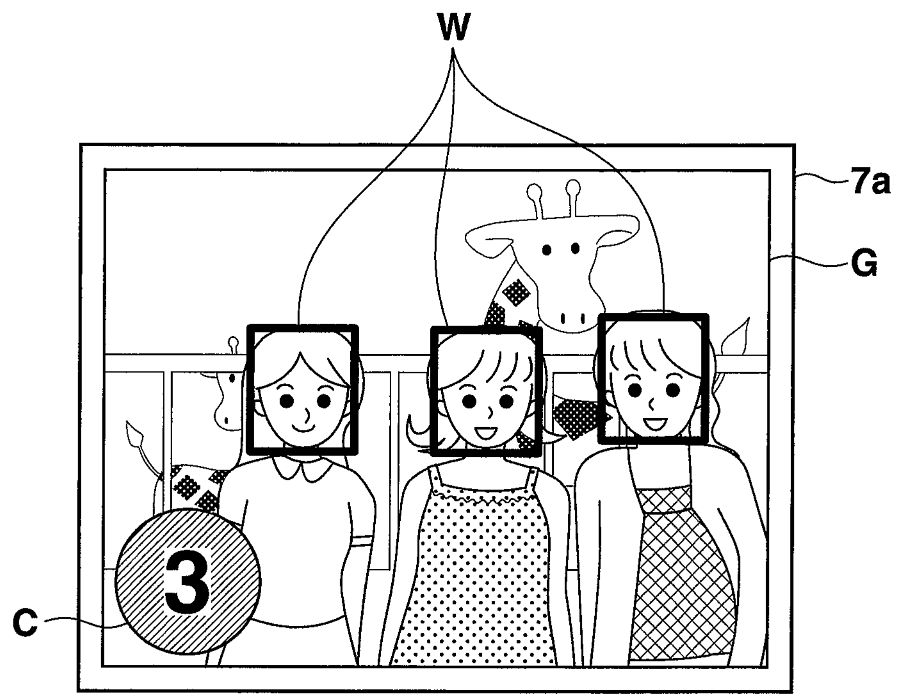
FIG. 9A is a diagram schematically showing an example of a display of a live view image regarding the modification of automatic imaging processing.
Figure 9B:
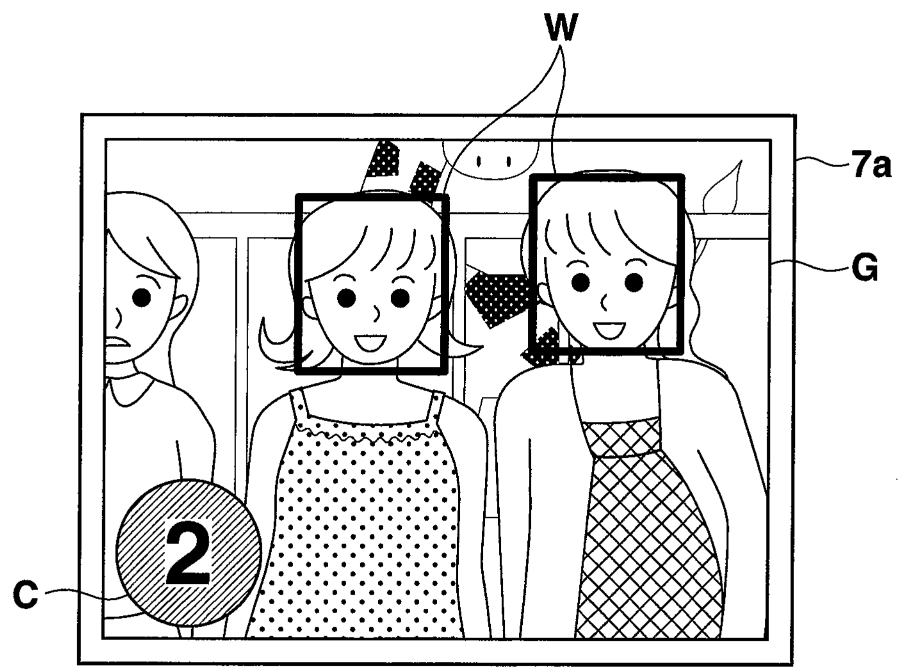
FIG. 9B is a diagram schematically showing an example of a display of a live view image regarding the modification of automatic imaging processing.

The descriptions of "3", "2" shown in FIG. 9A and FIG. 9B show the number of subjects in the specific state, and schematically show an example of the subject state display C.

Therefore, the subject state display C regarding the number of subjects in the specific state in the automatic imaging processing can be displayed on the display panel 7*a*, and the subject state display (condition related information) C can be displayed in a suitable size according to the number of subjects. For example, the subject state display C can be displayed relatively larger in relation to the display screen of the display panel 7*a* as the number of specified subjects increases. Consequently, it is possible to prevent the reduction of visibility of the subject state display C viewed from the subject even if the distance to the subject becomes relatively far.

According to the above described embodiment, the imaging instruction is input based on the predetermined operation of the shutter button by the user. However, this is one example, and the present invention is not limited to the above. For example, the imaging instruction can be input as the end of the detection of the face of the person as the subject, the detection of a specific movement (for example, wink, etc.) by the subject or the like.

The configurations of the imaging apparatuses 100 and 200 shown in the above embodiments are merely examples, and the present invention is not limited to the above. For example, the imaging apparatuses 100 and 200 can be a portable terminal provided with a display panel 7*a* and a lens section 1*a* of an imaging section 1 facing the user. The imaging apparatus 100 does not necessarily include a display panel 7*a* and for example, the display panel 7*a* can be a component separate from the apparatus.

In addition, according to the present embodiment, the functions such as the imaging control function, the condition related information setting function, the first specifying function, and the display control function are realized by driving the imaging control section 2, the condition related information setting section 7*c*, the first specifying section 6*b* and the display control section 7*b* under the control of the central control section 9. However, the present invention is not limited to the above, and the various functions can be realized by the central control section 9 executing predetermined programs.

In other words, a program including an imaging control processing routine, a condition related information setting processing routine, a specifying processing routine, and a display control processing routine is stored in the program memory (not shown) storing the program. According to the imaging control processing routine, the CPU of the central control section 9 can function as the section to control the automatic imaging processing which automatically images the subject with the imaging section under predetermined conditions after the imaging instruction is input. According to the condition related information setting processing routine, the CPU of the central control section 9 can function as the section to set the condition related information regarding the predetermined condition which changes during automatic imaging processing. According to the specifying processing routine, the CPU of the central control section 9 can function as the section to specify the number of subjects which is to be the target of imaging by the imaging section. According to the display control processing routine, the CPU of the central control section 9 can function as the section to display on the display section the set condition related information, at least one of the size and/or the position of the set condition related information changed according to the number of specified subjects.

Similarly, the functions of the second specifying function, the first setting control function, the second setting control function, and the selecting function can be realized by the CPU of the central control section 9 performing predetermined programs.

The computer readable storage medium to store the programs for performing the above processing can be a ROM, hard disk, etc., a nonvolatile memory such as a flash memory, a portable storage medium such as a CD-ROM, and the like. A carrier wave can be used as the medium to provide the data of the programs through a predetermined communication circuit.

Although various exemplary embodiments have been shown and described, the invention is not limited to the embodiments shown. Therefore, the scope of the invention is intended to be limited solely by the scope of the claims that follow and its equivalents.

While the present invention has been described with reference to the preferred embodiments, it is intended that the invention be not limited by any of the details of the description therein but includes all the embodiments which fall within the scope of the appended claims.

The entire disclosure of Japanese Patent Application No. 2012-194896 filed on Sep. 5, 2012 including specification, claims, drawings and abstract are incorporated herein by reference in its entirety.

What is claimed is:

1. An imaging apparatus comprising:

an imaging section;

a display section which displays an image imaged by the imaging section; and a CPU which is operable as:

an imaging control section which controls automatic imaging processing in which the imaging section automatically images a subject under a predetermined condition after an imaging instruction is input;

a condition related information setting section which sets condition related information regarding the predetermined condition which changes during the automatic imaging processing;

a first specifying section which specifies a number of subjects imaged by the imaging section as a target of imaging; and a display control section which displays on the display section the condition related information set by the condition related information setting section, the displayed condition related information changing in at least one of size and position in accordance with the number of subjects specified by the first specifying section;

wherein the predetermined condition is a condition regarding the automatic imaging processing in which the imaging section automatically images the subject after a predetermined amount of time passes from an input of the imaging instruction; and wherein the condition related information is a remaining time until the subject is imaged.

2. The imaging apparatus according to claim 1, wherein the display control section displays the condition related information to be relatively larger in relation to a display screen of the display section in accordance with an increase in the number of subjects specified by the first specifying section.

3. The imaging apparatus according to claim 1, wherein the display section is configurable to face the subject; and wherein the display control section displays a live view image imaged by the imaging section on the display section and the display control section displays the condition related information on the display section so as to be overlapped with the live view image.

4. The imaging apparatus according to claim 1, wherein the CPU is further operable as a second specifying section which specifies a position of a face of a person as the subject imaged by the imaging section, wherein the display control section displays the image of the person imaged by the imaging section on the display section, and the display control section displays the condition related information at a position different from the position of the face of the person in the image, the position of the face being specified by the second specifying section.

5. The imaging apparatus according to claim 1, wherein when a face of a person as the subject is not specified by the first specifying section, the display control section displays the condition related information to be relatively small in relation to a display screen of the display section at an edge portion of the display screen of the display section.

6. The imaging apparatus according to claim 1, wherein the CPU is further operable as a first setting control section which changes an amount of time up to which the imaging section images the subject in the automatic imaging processing in accordance with the number of subjects.

7. The imaging apparatus according to claim 6, wherein the first setting control section sets the amount of time up to which the imaging section images the subject in the automatic imaging processing to be relatively longer in accordance with an increase in the number of subjects specified by the first specifying section.

8. The imaging apparatus according to claim 1, wherein the CPU is further operable as a second setting control section which changes a number of times that the imaging section successively images the subject in the automatic imaging processing in accordance with the number of subjects.

9. The imaging apparatus according to claim 8, wherein the second setting control section relatively increases the number of times that the imaging section successively images the subject in the automatic imaging processing in accordance with an increase in the number of subjects specified by the first specifying section.

10. The imaging apparatus according to claim 8, wherein the CPU is further operable as a selecting section to select a specific image based on a state of a subject in the image from among a predetermined number of images successively imaged by the imaging section.

11. An imaging method for an imaging apparatus including an imaging section and a display section which displays an image imaged by the imaging section, the method comprising:

controlling automatic imaging processing in which the imaging section automatically images a subject under a predetermined condition after an imaging instruction is input;

setting condition related information regarding the predetermined condition which changes during the automatic imaging processing;

specifying a number of subjects imaged by the imaging section as a target of imaging; and displaying on the display section the set condition related information, the displayed set condition related information changing in at least one of size and position in accordance with the number of specified subjects;

wherein the predetermined condition is a condition regarding the automatic imaging processing in which the imaging section automatically images the subject after a predetermined amount of time passes from an input of the imaging instruction; and wherein the condition related information is a remaining time until the subject is imaged.

12. A non-transitory computer-readable storage medium having a program stored thereon for controlling a computer used in an imaging apparatus including an imaging section and a display section which displays an image imaged by the imaging section, wherein the program is executable to control the computer to perform functions comprising:

an imaging control function which controls automatic imaging processing in which the imaging section automatically images a subject under a predetermined condition after an imaging instruction is input;

a condition related information setting function which sets condition related information regarding the predetermined condition which changes during the automatic imaging processing;

a specifying function which specifies a number of subjects imaged by the imaging section as a target of imaging; and a display control function which displays on the display section the set condition related information, the displayed set condition information changing in at least one of size and position in accordance with the number of subjects specified by the specifying function;

wherein the predetermined condition is a condition regarding the automatic imaging processing in which the imaging section automatically images the subject after a predetermined amount of time passes from an input of the imaging instruction; and wherein the condition related information is a remaining time until the subject is imaged.

* * * * *